(12) United States Patent
Hewitt

(10) Patent No.: US 6,470,790 B1
(45) Date of Patent: Oct. 29, 2002

(54) PUSH ROD FOR A BRAKE BOOSTER

(75) Inventor: Wayne Hewitt, LaPorte, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/978,994

(22) Filed: Oct. 16, 2001

(51) Int. Cl.⁷ .............................. F16J 1/14; F15B 9/10; B21D 53/84
(52) U.S. Cl. .................. 92/187; 91/376 R; 29/888.09; 29/890.12
(58) Field of Search ..................... 92/128, 187; 91/368, 91/369.1, 374, 376 R; 72/356, 367.1, 370.1; 29/890.09, 890.12, 888.09, 882.2

(56) References Cited

U.S. PATENT DOCUMENTS

| | | | | |
|---|---|---|---|---|
| 2,375,574 A | * | 5/1945 | Metheny et al. | 29/888.09 X |
| 2,434,080 A | * | 1/1948 | Rosa | 29/888.2 X |
| 4,453,505 A | * | 6/1984 | Holtzberg et al. | 29/888.2 X |
| 5,657,680 A | * | 8/1997 | Gautier et al. | 91/369.1 |
| 5,761,983 A | * | 6/1998 | Gotoh et al. | 91/369.1 X |
| 5,810,054 A | * | 9/1998 | Goulet et al. | 72/370.1 X |
| 6,109,164 A | * | 8/2000 | Okuhara et al. | 91/376 R |
| 6,345,565 B1 | * | 2/2002 | Tsubouchi et al. | 91/376 R |

* cited by examiner

*Primary Examiner*—John E. Ryznic
(74) *Attorney, Agent, or Firm*—Leo H McCormick, Jr.; Warren Comstock

(57) ABSTRACT

A brake booster (210) having a valve body (20) for retaining a plunger (238) of a control valve assembly (228). The plunger (238) is being connected by an input rod (230) to a brake pedal through which and operator supplies an input force to effect a brake application. To effect a brake application, the input rod (230) moves the plunger (238) to control communication of a source of pressure between a first chamber and a second chamber (16) and create a pressure differential across a wall (18) for developing an output force. The input rod (230) is characterized by a cylindrical tube (232) having a first end (234) and a second end (236) with an external annular rib (240) located between the first end (234) and the second end (236). A first internal annular groove (242) located between the annular rib (40) and the first end (234) and a second internal groove (244) is located adjacent the first end (236) to define a socket (252). A plurality of slits (248) in the cylindrical tube (232) extend from the first end (234) toward the first internal annular groove (242) to define a plurality of resilient fingers (250, 250', ... 250"). A semi-spherical ball surface (264) on the plunger (238) is pushed into the socket (252) to fix or secure the input rod (230) to the plunger (238) and provide for a linearly transfer of input force from the brake pedal directly to plunger (238) through the cylindrical tube (232) to effect a brake application.

10 Claims, 2 Drawing Sheets

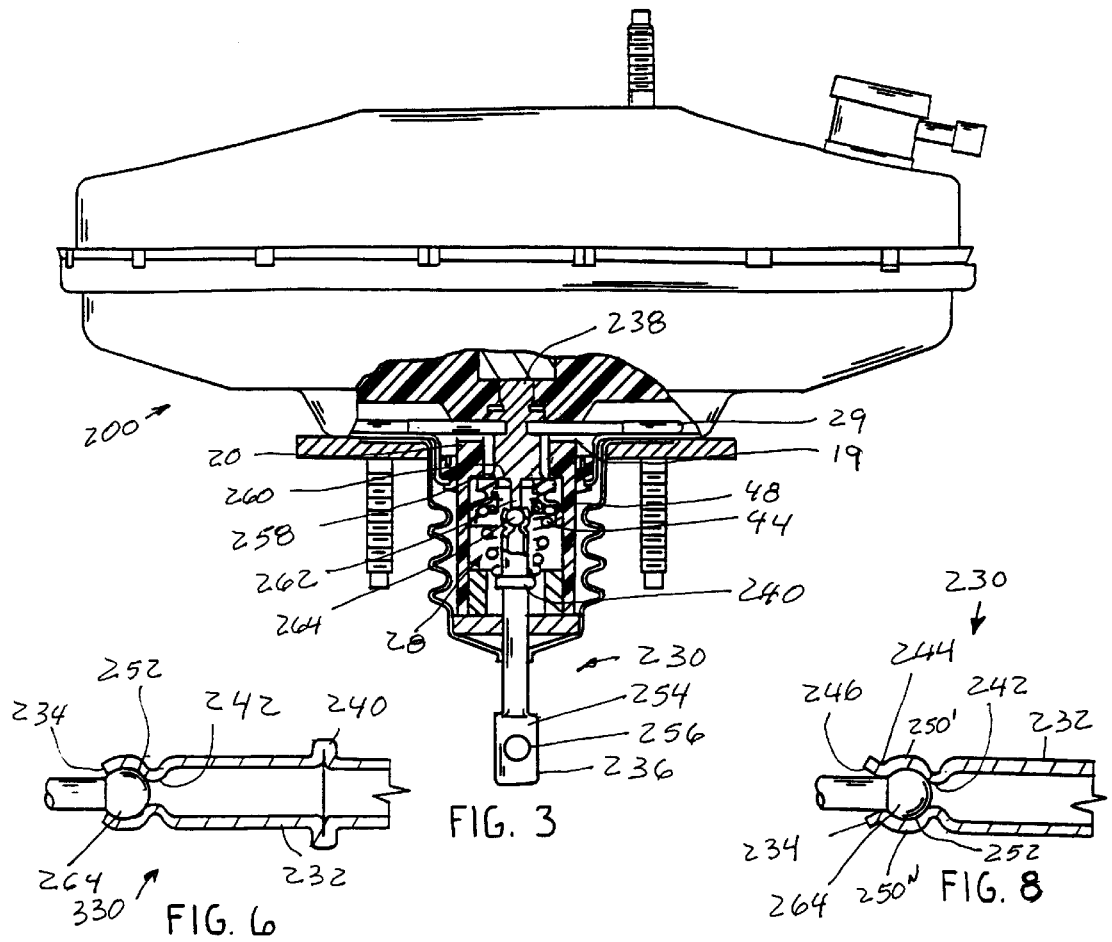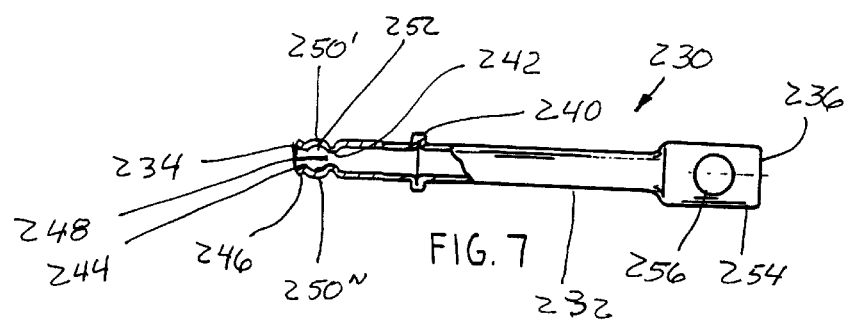

PUSH ROD FOR A BRAKE BOOSTER

BACKGROUND OF THE INVENTION

In brake boosters an input force is normally transmitted from a brake pedal through an input push rod to operate a valve arrangement. The valve arrangement controls the communication of fluid through which a pressure differential is created to develop an output force for effecting a brake application. The input push rod between brake pedal and valve is defined by a solid shaft having an eye on one end and a semi-spherical ball on the other end to provide for rotational movement of the brake pedal. With such an input push rod, the input force is communicated to a plunger of the valve arrangement along a linear path without the introduction of side forces that could effect a smooth operation of the brake booster. Because of strength requirements, the input push rod is normally made from a forged steel rod to transmit the operational input force that may be applied to effect a brake application. In an effort to reduce the overall weight of a brake booster, it has been suggested that an input push rod may be constructed of two different materials in U.S. Pat. Nos. 4,901,426; 5,230,134 and 5,606,790 to reduce weight and yet retains the strength requirements. While a two piece push rod may provide an option with respect to a one piece push rod, such a combination has not been accepted by the industry for use in a commercial brake booster.

SUMMARY OF THE INVENTION

A primary object of the present invention is to fabricate a push rod for a brake booster from a light weight cylindrical tube to provide a link between a brake pedal and a plunger of a valve arrangement.

According to this invention, a cylindrical tube is cut to a desired length from a source of supply. The cylindrical tube is transmitted to a first station and placed in a die where a first axial force is applied to a first end of the cylindrical tube and a second axial force is applied to a second end causing a portion of the cylindrical tube there between to be up-set into a cavity to form an external annular rib between the first end and the second end. Thereafter, the cylindrical tube is held stationary and a first annular groove is rolled into the cylindrical tube mid-way between the rib and the second end of the cylindrical tube and a second annular groove is rolled into the cylindrical tube adjacent the second end. The area between the first and second annular grooves defining an internal socket for receiving a spherical head on a plunger for a brake booster. Subsequently, opposite first and second radial forces are applied to a portion of the cylindrical tube adjacent the first end to flatten the cylindrical tube adjacent the first end into a substantially rectangular body. Then a hole that is perpendicular to the cylindrical tube is drilled or punched into the rectangular body. The hole receives a pin to connect the cylindrical body with a pedal pedal for applying an input force to move a plunger of a valve arrangement in a brake booster. This first embodiment of the input push rod may now be connected to a plunger for use in a valve arrangement of a brake booster. A poppet valve and return spring is located on the first end second end of the cylindrical tube and a force is applied to push a semi-spherical ball into the socket, The poppet valve and spring is compressed and a force is applied to crimp the first end around the semi-spherical head to join the cylindrical tube to the plunger for later installation into a valve body of a brake booster. This first embodiment of the input push rod requires equipment to be available to crimp the cylindrical tube to a valve plunger and as such equipment may not always be available the installation sequence differ a second embodiment of the invention provides a different option for joining the cylindrical tube to a plunger by rolling a second annular groove into the cylindrical tube adjacent the second end, cutting a plurality of slits cut from the second end toward the first annular groove to form a plurality of arcuate fingers and rolling a flange from the second annular groove to the second end. In this embodiment, after the return spring and poppet valve have been placed on the second end a force is applied to press semi-spherical ball on the plunger into the socket, the plurality of fingers flex to allow the semi-spherical ball to be resiliently held in the socket to join the cylindrical tube with the plunger. In any event, an input force applied through the pin connection on the first end is carried as a linear force through the cylindrical tube into the plunger to activate the valve arrangement and effect a brake application.

An advantage of this invention resides in a push rod defined by a cylindrical tube through which a linear force is applied to activate a plunger of a valve arrangement to effect the development of pressure differential in a brake booster during a brake application.

BRIEF DESCRIPTION OF THE DRAWINGS

FIG. 3 is a brake booster made according to the principals of the present invention with a sectional view of an input push rod connected to a plunger located in a valve body of a valve arrangement;

FIG. 6 is an enlarged sectional view of a portion of the front end of the cylindrical tube of FIG. 5 crimped onto a semi-spherical head on a plunger for a valve arrangement;

FIG. 7 is an enlarged sectional view of the front end of the cylindrical tube of FIG. 5 after additional forming steps have been performed to define a second input push rod;

FIG. 8 is an enlarged sectional view of a portion of the front end of the cylindrical tube of FIG. 7 after being resiliently attached to a spherical head on a plunger for a valve arrangement.

DETAILED DESCRIPTION

Figure 1:
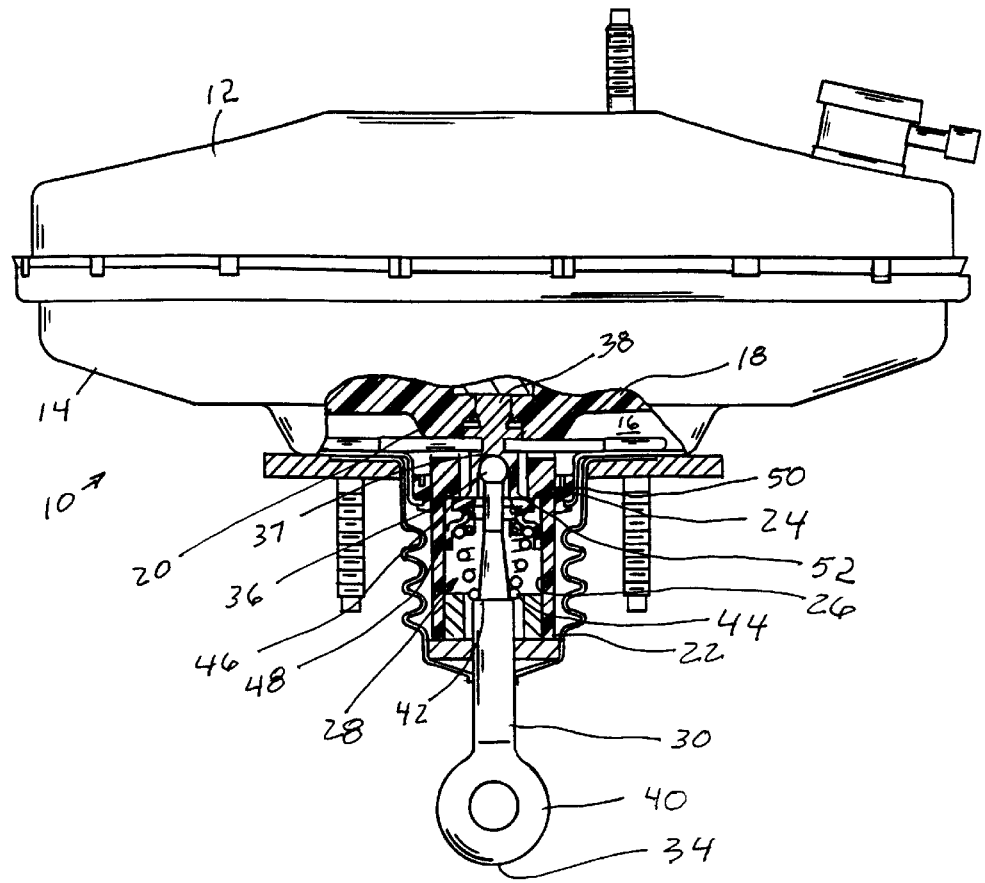
FIG. 1 is a typical brake booster of the prior art with a sectional view of an input push rod and plunger located a valve body of a valve arrangement.

The brake booster 10 illustrated in FIG. 1 is of a type known in the prior art wherein a front shell 12 is connected to a rear shell 14 to define a unitary housing. The interior of the housing is divided into a front chamber and a rear chamber 16 by a movable wall 18 that has a valve body 20 defined by a hub with a cylindrical projection 22 that extends through an opening 24 in the rear shell. An axial bore 26 in the valve body 20 retains a control valve assembly 28. The control valve assembly 28 that functions in a rest, neutral or actuation position and is shown in FIG. 1 is in a rest position condition where vacuum available in the front chamber evacuates air from the rear chamber 16. In an actuated position, an input force applied to a brake pedal is communicated through an input push rod 30 to moves a plunger 38 away from an environmental seat 52 to allow air from the surrounding environment to flow to the rear chamber 16 and develop a pressure differential across the wall 18 to create an output force for effecting a brake application.

Figure 2:
FIG. 2 is an enlarged view of the input push rod of FIG. 1.

The input push rod 30 as best shown in FIG. 2 is defined by a solid, forged one piece shaft that has a first end 32 and a second end 34. The first end 32 has a semi-spherical ball surface 36 that is designed to be mated with the central indentation or socket 37 in plunger 38 while the second end 34 has a ring 40 thereon through which the brake pedal is connected by a pin. The solid shaft has a step or shoulder 42 located toward the first end 32 which functions as a stop for a return spring 44 that urges a face 46 on a poppet member 48 toward a vacuum seat 50 in the valve body 20 and an atmospheric seat 52 on the plunger 38. The input push rod 30 while functioning in an adequate manner does require a number of manufacturing steps to be forged from a solid block of metal and is relatively heavy because of a need to provide sufficient strength required to transmit a brake force between the brake pedal and the control valve assembly 28. In addition, under some loading conditions, such as a panic stop, when a large input force is applied to the brake pedal because of a differences in diameters of the shaft from the first end 32 to the second end 34 the shaft may bend at the smallest diameter rather than move the plunger 38 to effect a desired brake application.

The brake booster 200 shown in FIG. 3 is similar to brake booster 10 of FIG. 1 and the same components carry the same number identification except for the input push rod 230 and plunger 238, made according to the present invention.

In more particular detail, a preferred input push rod 230 as shown in FIGS. 3, 7 and 8 is defined by a substantially cylindrical tube 232 having a first end 234 and a second end 236 with an external annular rib 240 located between the first end 234 and the second end 236. A first internal annular groove 242 is located between the annular rib 240 and the first end 234 and a second internal annular groove 244 is located between the first internal annular groove 242 and the first end 234. The first end 234 has a flare 246 that extends from the second annular groove 244, and in some circumstances the cylindrical tube 232 may also have a plurality of slits 248 (only one is shown) in FIG. 7 that extend from the first end 234 toward the first annular groove 242 to define a plurality of arcuate fingers 250,250', . . . 250". The interior area of the cylindrical tube 232 that is located between the first 242 and second 244 inner annular grooves defines a socket 252 adjacent the first end 234. The second end 236 of the cylindrical tube 232 is defined by a substantially rectangular shape 254 with a hole 256 therein that is perpendicular to the axis of the cylindrical tube 232.

The plunger 238 in addition to having an atmospheric seat 258 located on the rear face 260 thereof has a cylindrical projection 262 extending therefrom with a semi-spherical ball surface 264 thereon. The height of the semi-spherical ball surface 264 from the rear face 260 is greater in length than a length from the first end 234 on the cylindrical tube 232 to the first internal groove 242. With the semi-spherical ball surface 264 located in socket 252 the difference in lengths, permits end 234 to rotate up to 5 degrees from an axial center the plunger 238 without end 234 engaging the rear face 260.

Figure 4:
FIG. 4 is a view of a cylindrical tube cut to a desired length to define a link between a brake pedal and a plunger in a brake booster.

In more particular detail, the input push rod 230 is fabricated from a cylindrical tube 232 as illustrated in FIG. 4 that is cut to a specified length to define a link between a brake pedal and a control valve assembly located in a brake booster for a vehicle brake system. The steps used in fabrication of the input push rod 230 can be better understood in conjunction with the drawings illustrated in FIGS. 4 and 5 and in particular:

a length of cylindrical tube 232 is cut to a desired length from a supply and transmitted to a first station;

at the first station the cylindrical tube 232 is positioned in a die where a first axial force is applied in a first direction to a first end 234 and a second axial force is applied in a second opposite direction to a second end 236. The first and second axial forces being sufficient to cause a portion of the cylindrical tube 232 to be up-set into the die to form an external annular projection or rib 240;

thereafter, the cylindrical tube 232 is held stationary and a first internal groove 242 is rolled therein a first distance from the first end 234 and the annular rib 240.

Figures 5, 5A, 5B:
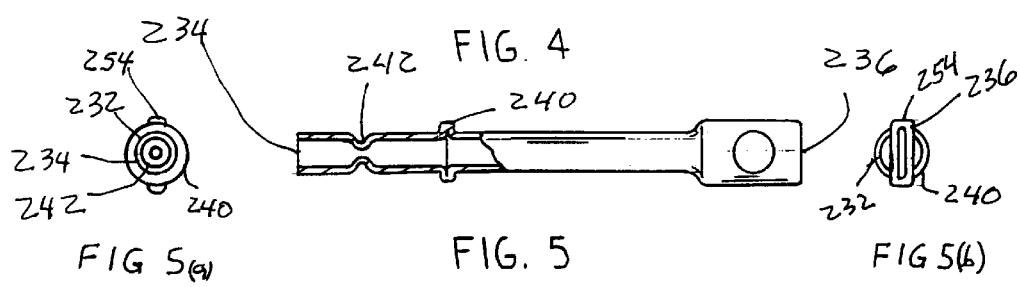
FIG. 5 is partial sectional view of the cylindrical tube of FIG. 4 after performing a series of forming steps to define a first input push rod.
FIG. 5a is a view of a front end of the input push rod of FIG. 5.
FIG. 5b is a view of a rear end of the cylindrical tube of FIG. 5.

This completes the fabrication of a first embodiment of an input push rod 330 as best shown in FIGS. 5 and 6. This first embodiment of the input push rod 330 is then transferred to a second station where the some of the other components that make up the control valve assembly 28 are assembled onto the input push rod 330. In particular, return spring 44 and poppet member 48 are placed on the cylindrical body 232 of control valve assembly. The return spring 44 is compressed and the semi-spherical ball surface 264 is inserted into socket 252. A radial force is applied to the first end 234 causing the first end 234 to be crimped around the semi-spherical ball surface 264 in a manner as illustrated in FIG. 6. Thereafter, the control valve assembly 28 is inserted into bore 26 and key 29 inserted between a slot 19 in the hub or valve body 20 to hold the control valve assembly 28 in the movable wall 18.

In the preferred or second embodiment of the input push rod 230 of the present invention additional steps are performed in the forming of the cylindrical tube 232 after the steps as illustrated in FIG. 5 for the first embodiment. The following steps are added to the process disclosed above with respect to input push rod 330. A second internal groove 244 is rolled in cylindrical tube 232 adjacent the first internal groove 242 with the space between the first and second internal grooves defining a socket 252 adjacent the first end 234 as illustrated in FIG. 7. The depth of the second internal groove 244 is different from the depth of the first internal groove 242 and may be less that half its depth such that some resiliency is provided to allow semi-spherical ball surface 264 to be pushed into socket 252. In addition, a flare 246 is formed on the first end 234 that extends from the bottom of the second internal groove 244 to the first end 234 as illustrated in FIG. 7.

To further assure that the semi-spherical ball surface 264 may located in socket 252 without deforming the first end 234, a plurality of slits 248 are cut in the cylindrical body 232 that extend from the first end 234 toward the first internal groove 242 to form a plurality of arcuate fingers 250,250', . . . 250" on the first 234 of the cylindrical body 232. The arcuate fingers 250,250', . . . 250" define a resilient projection that simultaneously flex away from the cylindrical tube 232 when as the semi-spherical ball surface 264 engage flare 246 and is pushed into the socket 252. This completes the frabrication of the preferred embodiment of the input push rod 230 and it is transferred to the second station where as before the return spring 44 and poppet member 48 are placed on the first end 234. Now the plunger 238 is moved toward the first end 234 and engages the flare 246 that leads to the second internal groove 244. Less force is required that to assembly with the input push rod 230 than the input push rod 330 described above as now the assembly force need only push the semi-spherical ball surface 264 into socket 252 by expanding or flexing the plurality of fingers 250,250', . . . 250" to resiliently retain and secure the semi-spherical ball surface 264 in socket 252, as illustrated in FIG. 8 rather deforming the material of the cylindrical tube 232 of second internal groove 244 and relying on the coefficient of expansion of the metal to secure and retain the semi-spherical ball surface 264 in socket 252 adjacent the first end 234. Thereafter, the plunger 238 and input push rod 230 are inserted into bore 26 and key 29 inserted between a slot 19 in the hub or valve body 20 to hold the control valve assembly 28 in the movable wall 18.

The input push rods 230 and 330 of the present invention allow substantially the entire input force applied to the first end 234 of the cylindrical tube 232 to be linearly transmitted into the plunger 238 and be utilized in the development of an output force to effect a brake application.

I claim:

1. A brake booster having a valve body for retaining a plunger of a control valve, said plunger being connected by an input rod to a brake pedal, said brake pedal responding to an input force by an operator by moving the plunger to control communication of a source of pressure between a first chamber and a second chamber and create a pressure differential across a wall for developing an output force to effect a brake application, the input rod being characterized by a cylindrical tube having a first end and a second end with an annular rib located between the first end and the second end, a first annular groove located between said annular rib and said first end and a second annular groove located between the first annular groove and said first end such that an interior area of the cylindrical tube between said first and second annular grooves defines a socket, said cylindrical tube having a substantially rectangular shape with a hole therein perpendicular to the cylindrical tube adjacent said second end, said cylindrical tube being connected to said brake pedal by a pin located in said hole and resiliently connected to said plunger by snapping a semi-spherical ball thereon into said socket formed such an input force applied from the brake pedal through the pin is linearly transmitted directly through the cylindrical tube to move the plunger.

2. The brake booster as recited in claim 1 wherein said first end is further characterized by a radial flare to assist in aligning said spherical ball in said socket.

3. The brake booster as recited in claim 2 wherein said second annular groove is characterized by having a depth which is approximately one-half the depth of said first annular groove.

4. The brake booster as recited in claim 2 wherein said cylindrical tube is characterized by a plurality of axial slits that extend from said first end toward said first annular groove to define a plurality of locking fingers adjacent said first end.

5. A brake booster having a valve body for retaining a plunger of a control valve, said plunger being connected by an input push rod to a brake pedal, said brake pedal responding to an input force by an operator by moving the plunger to control communication of a source of pressure between a first chamber and a second chamber and create a pressure differential across a wall for developing an output force to effect a brake application, the input push rod being characterized by a cylindrical tube having a first end and a second end with an external annular rib located between the first end and the second end and an internal annular groove located between said annular rib and said first end, said cylindrical tube having a substantially rectangular shape with a hole therein perpendicular to the cylindrical body adjacent said second end, said cylindrical body being connected to said brake pedal by a pin located in said hole and first end of said cylindrical tube receiving a semi-spherical ball that engages said internal annular groove and said first end being crimped around said semi-spherical ball to define a mechanical connection such that an input force applied from the brake pedal through the pin is linearly transmitted directly through the cylindrical tube to move the plunger.

6. The brake booster as recited in claim 5 wherein crimp on said first end is characterized by partially surrounding said semi-spherical ball in a manner that allows up to a lateral deflection of 5 degrees from an axial alignment between said pin and said plunger.

7. The brake booster as recited in claim 6 wherein said external annular rib is characterized by forming a stop for a resilient member that urges a poppet valve toward a seat on said plunger.

8. A method of fabricating an input push rod that links a brake pedal with a plunger in a control valve assembly of a brake booster comprising the steps of:

cutting a cylindrical tube to a desired length corresponding to a distance between the brake pedal and the plunger in the control valve assembly;

transmitting said cylindrical tube to a first station and holding the cylindrical tube stationary while applying a first axial force to a first end and a second axial force to a second end causing a portion of said cylindrical tube to up set into a die to form an external annular rib between said first end and said second end;

holding said cylindrical tube stationary while rolling a first internal annular groove between said external annular rib and said first end and a second internal groove between said first internal groove and said first end to define a socket adjacent said first end, said depth of said second internal groove being less than said first internal groove such that a semi-spherical ball that extends from the plunger may be pushed into said socket to secure said cylindrical tube to the plunger.

9. The method as recited in claim 8 further including a step of forming slits in said cylindrical tube that extend from said first end toward said first internal groove to define a plurality of fingers adjacent said first end, said fingers resiliently expanding to allow said semi-spherical ball to be inserted into said socket.

10. The method as recited in claim 9 further including a step of rolling a flare into said cylindrical body that extends from said second internal groove to said first end, said flare assisting in aligning said semi-spherical ball with said socket on movement of the plunger toward the cylindrical tube.

* * * * *